United States Patent
Aschpurwis et al.

(10) Patent No.: US 11,225,382 B2
(45) Date of Patent: Jan. 18, 2022

(54) CONVEYOR UNIT HAVING ADJUSTABLE TRANSPORT ROLLERS

(71) Applicant: SIEMENS AKTIENGESELLSCHAFT, Munich (DE)

(72) Inventors: Carsten Aschpurwis, Constance (DE); Thomas Froehlich, Allensbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/483,124

(22) PCT Filed: Dec. 20, 2017

(86) PCT No.: PCT/EP2017/083720
§ 371 (c)(1),
(2) Date: Aug. 2, 2019

(87) PCT Pub. No.: WO2018/141459
PCT Pub. Date: Aug. 9, 2018

(65) Prior Publication Data
US 2020/0024077 A1    Jan. 23, 2020

(30) Foreign Application Priority Data
Feb. 2, 2017  (EP) .................................. 17154325

(51) Int. Cl.
*B65G 43/08*    (2006.01)
*B65G 13/06*    (2006.01)
(Continued)

(52) U.S. Cl.
CPC ........... *B65G 43/08* (2013.01); *B65G 13/065* (2013.01); *B65G 39/07* (2013.01); *B65G 39/12* (2013.01);
(Continued)

(58) Field of Classification Search
None
See application file for complete search history.

(56) References Cited

U.S. PATENT DOCUMENTS 1,743,044 A  *  1/1930  Morgan ................. B65G 47/22
                                                   198/782
6,889,815 B2 *  5/2005  Kanamori ............ B65G 1/0478
                                                   198/369.4
(Continued)

FOREIGN PATENT DOCUMENTS

CN    201670572 U    12/2010
CN    202828695 U    3/2013
(Continued)

*Primary Examiner* — William R Harp
(74) *Attorney, Agent, or Firm* — Laurence A. Greenberg; Werner H. Stemer; Ralph E. Locher

(57) ABSTRACT

A conveying unit for transporting goods on transport rollers in a transport plane. The transport rollers can be rotated about their respective axes of rotation with an adjustable rotational speed and adjustable direction of rotation. The axes of rotation of the transport rollers are adjustable by rotation about their respective pivot axes by a particular pivot axis angle, and at least two of the transport rollers can be adjusted differently from one another. There is also described a method for adjusting the conveyor unit.

13 Claims, 6 Drawing Sheets

(51) Int. Cl.
*B65G 39/07* (2006.01)
*B65G 39/12* (2006.01)

(52) U.S. Cl.
CPC ............... *B65G 2203/0225* (2013.01); *B65G 2203/0233* (2013.01); *B65G 2203/0291* (2013.01); *B65G 2207/14* (2013.01); *B65G 2811/092* (2013.01); *B65G 2811/097* (2013.01)

(56) References Cited

U.S. PATENT DOCUMENTS

| | | | | |
|---|---|---|---|---|
| 8,474,596 | B2* | 7/2013 | Wolkerstorfer | B65G 13/10 198/370.09 |
| 9,309,954 | B2* | 4/2016 | Wilkins | B65G 39/025 |
| 9,499,341 | B2* | 11/2016 | Wilkins | B65G 13/065 |
| 9,643,792 | B2* | 5/2017 | Vetter | B65G 47/244 |
| 9,878,856 | B2* | 1/2018 | Specht | B65G 13/10 |
| 10,518,975 | B2* | 12/2019 | Itoh | B65G 47/46 |
| 10,549,917 | B2* | 2/2020 | Garehan | B65G 13/10 |
| 10,577,189 | B2* | 3/2020 | Itoh | B65G 15/22 |
| 10,752,445 | B2* | 8/2020 | Froehlich | B65G 39/025 |
| 2003/0234155 | A1* | 12/2003 | Kanamori | B65G 13/10 198/394 |
| 2008/0169171 | A1* | 7/2008 | Itoh | B65G 13/10 198/412 |
| 2016/0145053 | A1 | 5/2016 | Vetter et al. | |

FOREIGN PATENT DOCUMENTS

| | | |
|---|---|---|
| CN | 104884370 A | 9/2015 |
| EP | 1375389 A1 | 1/2004 |
| EP | 1947035 A1 | 7/2008 |

* cited by examiner

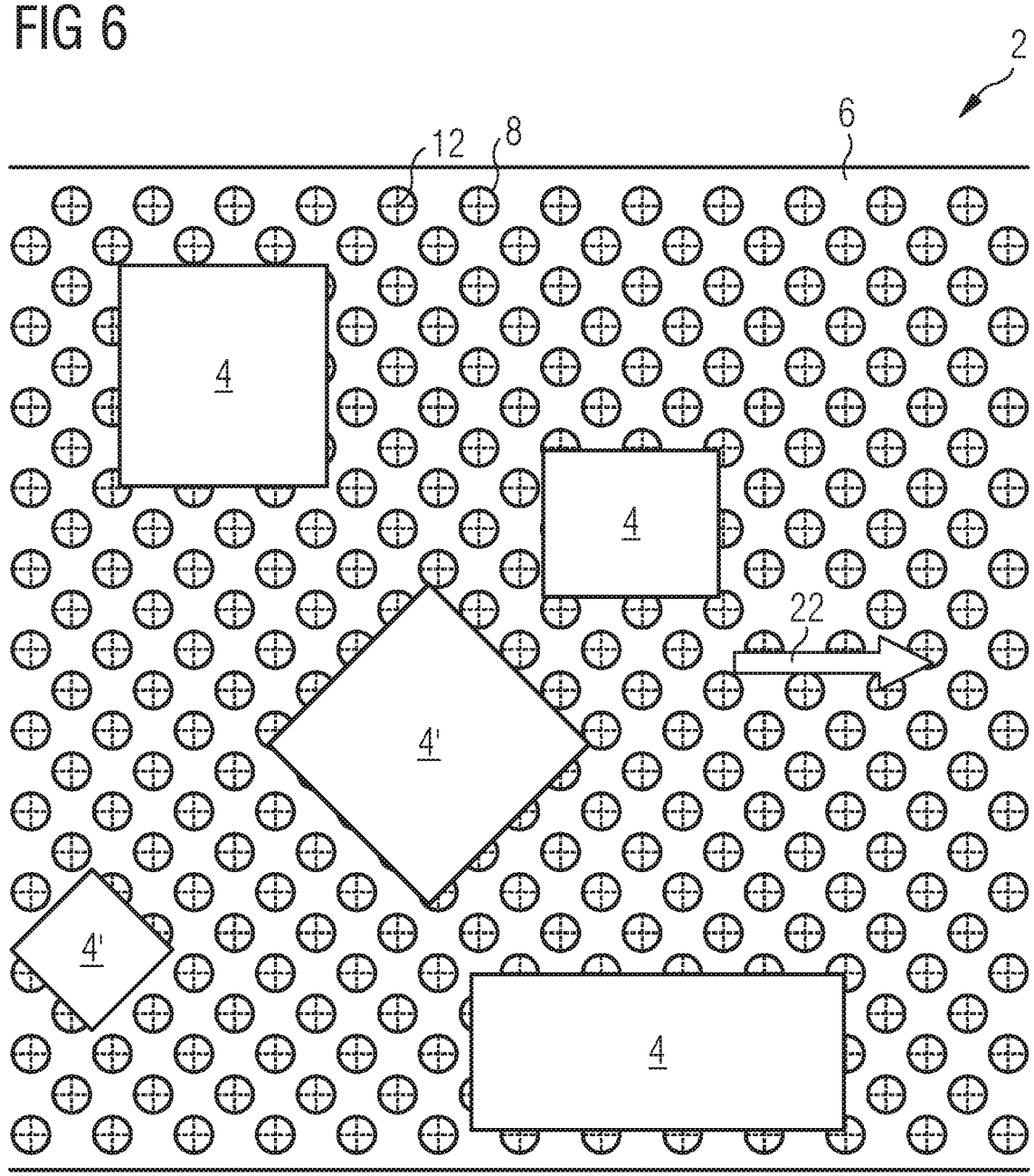

CONVEYOR UNIT HAVING ADJUSTABLE TRANSPORT ROLLERS

BACKGROUND OF THE INVENTION

Field of the Invention

The present invention relates to the technical field of conveying systems for goods, in particular to conveying systems which permit a directed conveying and a change in direction of goods.

A directed conveying of goods in adjustable transport directions on a conveyor line is particularly important in sorting facilities, in particular mail and baggage sorting facilities, and manufacturing facilities. A solution integrated into the conveyor line for adjusting the transport directions can render expensive components such as a corner converter superfluous. The change in the orientation of a goods item—during transport or without a change of position—can also be advantageous for automated detection. The skillful manipulation of a flow of goods permits the use of a conveying system beyond normal transport and enables buffers, singulation, lane changes by means of steering, rotating at a standstill or in transit, diversion, merging and crossing function.

The prior art for directed conveying is the use of castors mounted on a vertical axis. Around this axis, the castors are altered in their angular setting specifically or as a line by way of guides. Orthogonally freely rotating, jointly drivable rollers are also used. If active conveying is to take place in a specific direction, additional rollers are moved up to a goods item. A further solution uses a cylindrical roller arranged obliquely in a link belt. Transverse transport is triggered by applying a friction surface to the link belt from below, as a result of which the cylindrical roller carries out a forced movement.

In the solutions presented above, the transport rollers can only be pivoted back and forth jointly in a discrete manner between two or three positions and are driven jointly. An individual adjustment of specific transport rollers is not possible, so that the possibilities of directed conveying and manipulation of the orientation of the goods item are limited. A different treatment of goods conveyed next to each other is not possible. Changing the orientation of a goods item during transport is also only possible to a limited extent. Therefore, an improved solution which is versatile is required.

SUMMARY OF THE INVENTION

The object of the present invention is therefore to provide a conveying unit and a method for adjusting a conveying unit in order to be able to transport a goods item with little effort and nevertheless with many degrees of freedom. This object is achieved by the solutions described in the independent claims.

The solution according to the invention provides a conveying unit for transporting goods on a transport plane comprising transport rollers, wherein the transport rollers can be rotated about their respective axes of rotation with an adjustable rotational speed and an adjustable direction of rotation, the axes of rotation of the transport rollers are adjustable by rotation about their respective pivot axes by a particular pivot axis angle, and at least two of the transport rollers can be adjusted differently from one another.

An ability to be adjusted differently from one other should be understood in this case as individual adjustability of specific transport rollers or of transport roller groups with regard to the parameters rotation speed, rotation direction and pivot axis angle, wherein the individual adjustability only comprises one, two or all the parameters. The individual adjustability essentially possible also includes an identical adjustment of these parameters.

The conveying unit according to the invention is suitable, depending on the embodiment, for different types of goods, for example, packages, parcels, letters and other mail, suitcases and baggage, crates, containers and piece goods to be picked. Similar or different goods can be transported. Besides directed conveying in the broader sense, transport is also to be understood to mean a change in the orientation of the goods item with or without changing its center of gravity. With the conveying unit according to the invention, goods can thus be manipulated beyond normal straight-line conveying.

In order to enable a structurally simple arrangement and storage of the transport rollers as well as to avoid unnecessarily complicating the calculation of a resulting transport direction and transport velocity of a transport roller, the axis of rotation can be arranged essentially parallel to the transport plane and the pivot axis essentially orthogonally to the transport plane.

According to one embodiment, the transport rollers can have a rounded surface in an area provided for contact with the goods. Compared to a cylinder jacket-like surface, a change in the pivot axis angle is more easily possible with a rounded surface. Furthermore, a rounded surface has fewer interfering contours. A spherical surface is a special form of rounded surface.

In order to simplify the simultaneous adjustment of the axes of rotation of a plurality of transport rollers, the conveying unit may comprise an adjustment device which is designed to jointly adjust the pivot axis angles of two or more transport rollers. This adjustment device makes it possible to reduce the construction of the conveying unit. By means of differing adjustment of the rotational speed and/or the direction of rotation, the goods item can still be transported with many degrees of freedom.

In order to drive the transport rollers, the conveying unit may comprise actuatable drive means for driving a transport roller. This enables controlled, individual driving of specific transport rollers in an uncomplicated manner and thus use of the conveying unit in a particularly simple manner beyond simple transport, even with corresponding pivot axis angles.

According to a further embodiment, the drive means can be designed as servo drives. This makes it possible to ensure a robust and precise position, velocity and/or torque regulation of the transport rollers of the conveying unit with readily available components.

In order to allow even greater variability of transport, the transport rollers can be driven in a positive direction of rotation and/or a negative direction of rotation.

In order to enable fine adjustment of the transport direction of one or more transport rollers, the pivot axis angle can be continuously adjustable.

In order to simplify a coordinated adjustment of the transport rollers, two or more transport rollers can be arranged in an ordered manner, for example along a line or in a circle. This simplifies the controlled adjustment of all the transport rollers of the conveying unit. The ordered arrangement can also be implemented several times with multiple conveying units.

In order to achieve an improved frictional connection between the transport roller and the goods item, the circumferential surface of a transport roller in an area provided for contact with the goods can be designed in an optimized manner for the transport of the goods with regard to contour and/or surface quality. An improved frictional connection permits extremely precise transport as this is accompanied by a reduction in uncontrolled movements of the goods item, for example sliding.

According to a further embodiment, the conveying unit may comprise a control unit which is designed to actuate the transport rollers. This allows an actuatable adjustment of the pivot axis angle, rotational speed and/or direction of rotation of the transport rollers.

In order to enable even more optimized actuation of the transport rollers, the control unit can be designed to actuate the transport rollers as a function of the position and/or orientation of one or more goods items. This actuation can take place manually and/or automatically.

With regard to a method, this object is achieved by a method for adjusting a conveying unit comprising transport rollers for transporting goods on a transport plane, wherein the transport rollers can be rotated about their respective axes of rotation with an adjustable rotational speed and an adjustable direction of rotation and the axes of rotation of the transport rollers are adjustable by rotation about their respective pivot axes by a particular pivot axis angle.

The method comprises the steps:

a) The rotational speed, the direction of rotation and the pivot axis angle of the transport rollers of the conveying unit are individually adjusted;

b) A goods item is transported by the adjusted transport rollers.

In order to enable manipulation of a goods item in a variety of ways by way of linear transport of a goods item, the rotational speed and/or direction of rotation and/or pivot axis angle of at least two of the transport rollers of the conveying unit can be adjusted differently from one another.

According to a further embodiment, two or more conveying units can be adjusted in a coordinated manner. This allows influencing of a goods item over a larger area and thus allows: braking and accelerating, buffers, singulation, lane changes by means of steering, rotating at a standstill or during transport, diversion, parallel diversion of a plurality of goods, diversion at a certain point with simultaneous alignment, merging, crossing function, targeted shifting of gaps between goods, changing the sequence of goods and more.

BRIEF DESCRIPTION OF THE SEVERAL VIEWS OF THE DRAWING

Embodiments of the invention are explained in more detail hereinafter with reference to the figures by way of example. The figures show:

FIG. 6 A further conveying unit in plan view.

DESCRIPTION OF THE INVENTION

Figure 1:
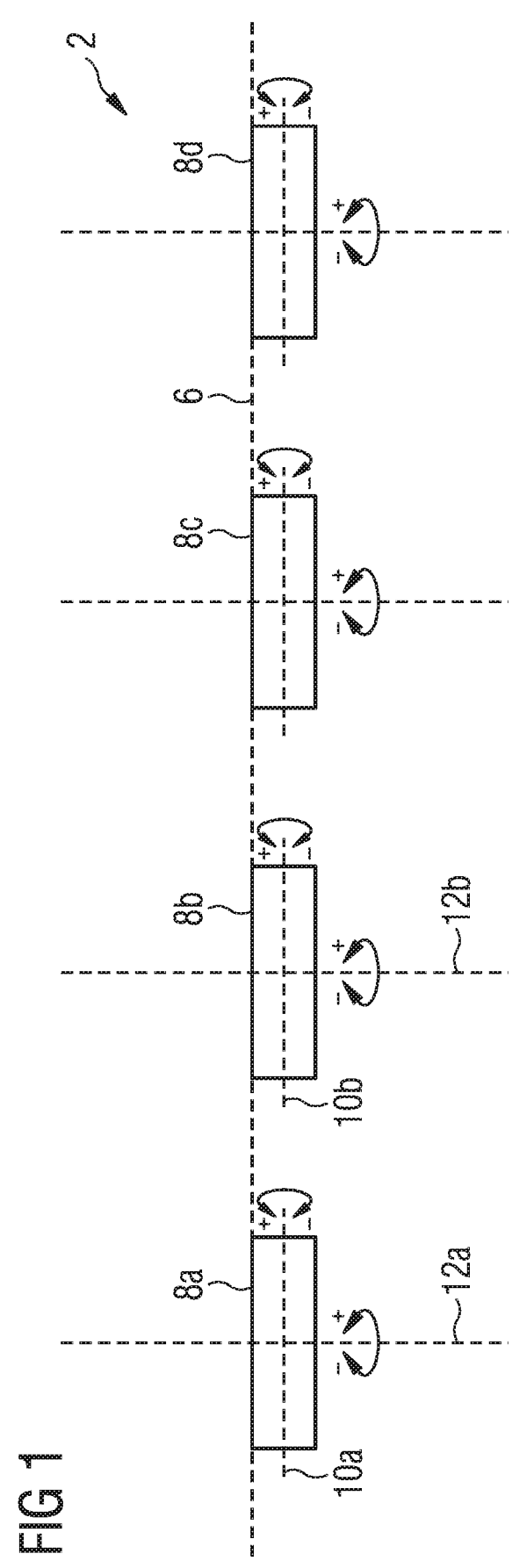
FIG. 1 A conveying unit according to the invention with all degrees of freedom.

FIG. 1 shows the degrees of freedom of a conveying unit 2 according to an embodiment of the invention in a lateral cross-section. The conveying unit 2 comprises transport rollers 8a-8d, each with its own axis of rotation 10a-10d, and its own pivot axis 12a-12d, wherein the transport rollers 8a-8d span a transport plane 6. By driving the transport rollers 8a-8d, a goods item 4 not shown here on at least one of the transport rollers 8a-8d can be transported along the transport plane 6 and/or altered in its orientation—simultaneously or sequentially. The transport rollers 8a-8d can be rotated about their respective axis of rotation 10a-10d with an adjustable rotational speed and adjustable direction of rotation. The rotational speeds may coincide in magnitude and/or sign with each other and/or differ from one another completely or in groups. A positive rotational speed corresponds to a positive direction of rotation, a negative rotational speed to a negative direction of rotation. The transport rollers 8a-8d with their own axes of rotation 12a-12d can be rotated by particular pivot axis angles 14a-14d, whereby their respective transport directions 34a-34d are adjustable. The transport rollers 8a-8d thus have three adjustable degrees of freedom—the rotational speed, the direction of rotation and the pivot axis angle—which are individually adjustable. An individual adjustability here also includes the adjustment of two or more of the transport rollers 8a-8d with regard to all or specific instances of the three adjustable degrees of freedom coinciding or being jointly adjustable. The transport rollers 8a-8d can thus be adjustably rotated at the same and/or a different velocities about their axes of rotation 10a-10d. The pivot axis angles 14a-14d of two or more transport rollers 8a-8d can be adjusted in accordance with and/or differently from one another.

If the transport rollers 8a-8d are arranged such that their axes of rotation 10a-10d are in the drawing plane, the transport direction 34a-34d of the transport rollers 8a-8d is into or out of the drawing plane—depending on the direction of rotation. As shown in FIG. 1, the transport rollers 8a-8d may be cylindrical, but also rounded, cambered, like the surface of a ball or otherwise spherical in design. In the case of a pivot axis 12a not arranged orthogonally to the transport plane 6 and a cylindrical transport roller 8a, when adjusting the axis of rotation 10a about the pivot axis 12a by a pivot axis angle 14a, the transport roller 8a would protrude from the transport plane 6.

In order to rotate a goods item 4 which is supported equally on all four transport rollers with axes of rotation adjusted in parallel and corresponding pivot axis angles 14 on the spot, the two right-hand transport rollers 8c, 8d can be driven in a positive direction of rotation and the two left-hand transport rollers 8a, 8b in a negative direction of rotation but at a corresponding amount of rotational speed—or vice versa. Instead of driving the transport rollers 8a-8d in the opposite direction of rotation, alternatively the pivot axis angles 14a-14d could also be adjusted.

At least two differently adjustable transport rollers 8 are required to rotate a goods item 4. With more transport rollers 8, the guiding of the goods item 4 is improved.

Figure 2:
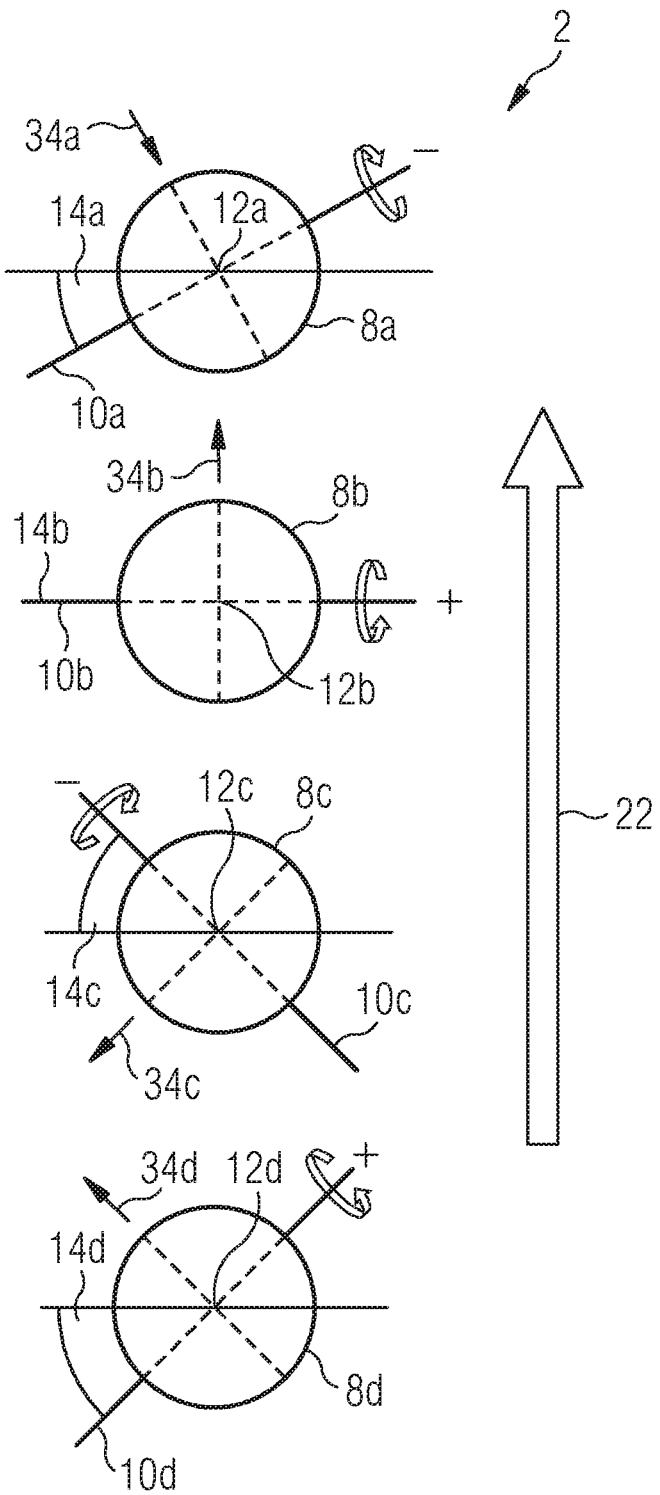
FIG. 2 A section of a further conveying unit with transport rollers adjusted differently from one another.

FIG. 2 shows in plan view a section of a further conveying unit 2 with differently adjustable transport rollers 8a-8d according to a further embodiment of the invention. Only the transport direction 34b of the transport roller 8b coincides with the main transport direction 22 of the conveying unit 2, the pivot axis angle 14b is 0° in this case. The transport rollers 8a, 8c are driven in the negative direction of rotation, the transport rollers 8b, 8d in the positive direction of rotation.

Figure 3:
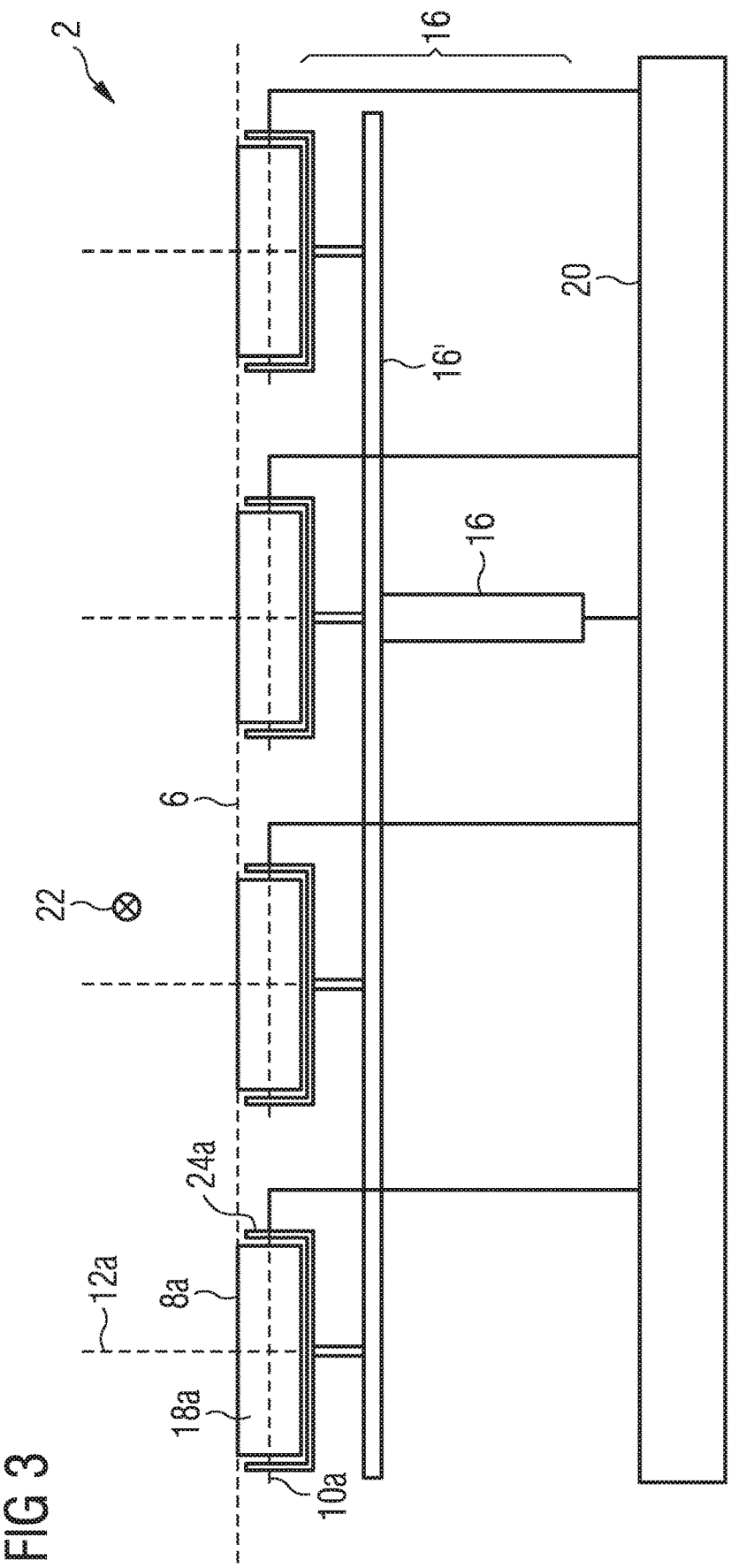
FIG. 3 A conveying unit with a joint adjustment device for all the transport rollers.

FIG. 3 shows a cross-section of a conveying unit 2 with a control unit 20 and a common adjustment device 16 for all transport rollers 8a-8d according to a further embodiment of the invention. The transport rollers 8a-8d are fastened to transport roller bearings 24a-24d and are each connected to the control unit 20. The transport rollers 8a-8d comprise their own drive means 18a-18d integrated into the respective transport roller 8a-8d. The control unit 20 is designed to actuate the adjustment device 16 and the drive means 18a-18d. The drive means 18a-18d can be individually actuated and regulate the direction of rotation and angular velocity of the respective transport roller 8a-8d, an embodiment of the drive means 18a-18d is particularly well suited as a servo drive as these are designed for accurate individual adjustment and actuation. The adjustments of the transport rollers 8a-8d can be actuated and adjusted using the control unit 20.

The adjustment device 16 connected to the control unit 20 is mechanically connected via an adjustment device axis 16' to the transport roller bearings 24a-24d, so that the axes of rotation 10a-10d of all the transport rollers 8a-8d can be jointly adjusted by the same pivot axis angle 14a-14d. The axes of rotation 10a-10d thus always remain parallel to one another. The pivot axis angles 14a-14d can be continuously adjusted with the adjustment device 16 and thus assume random angular values between 0° and 360°. The continuous adjustment of any angular values allows a very accurate adjustment of the transport direction 34a-34d of the transport rollers 8a-8d.

However, restricting the pivot axis angle to values between, for example, +−45° or +−90° is also conceivable. Nevertheless, by adjusting the direction of rotation with positive and negative directions of rotation, any transport direction 34 of the transport rollers 8a-8d can be achieved. A manipulation of the goods 4 is also achieved by different rotational speeds and/or directions of rotation of the transport rollers 8a-8d.

Figure 4:
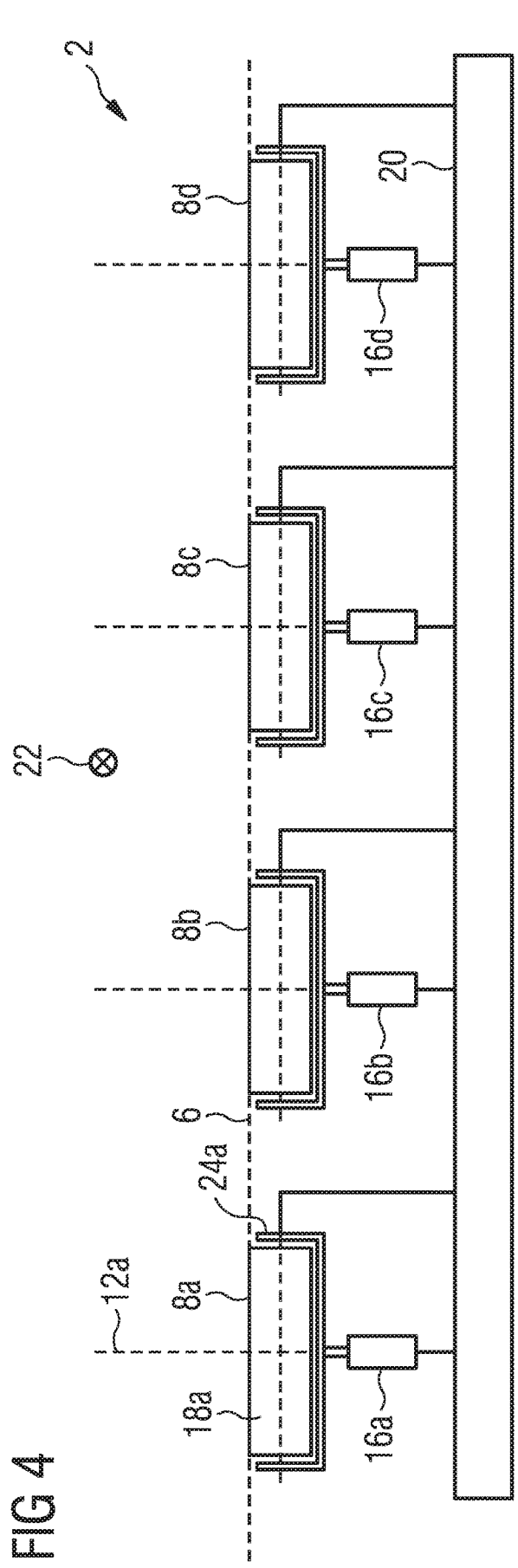
FIG. 4 A conveying unit with its own adjustment device for each transport roller.

FIG. 4 shows a further conveying unit 2 with its own adjustment device 16a-16d for each transport roller according to an embodiment of the invention. Each of the transport rollers 8a-8d comprises a separate, individually adjustable drive means 18a-18d which can be individually actuated by the control unit 20. The adjustment devices 16a-16d are also designed to be individually adjustable and individually actuatable by the control unit 20.

Figure 5:
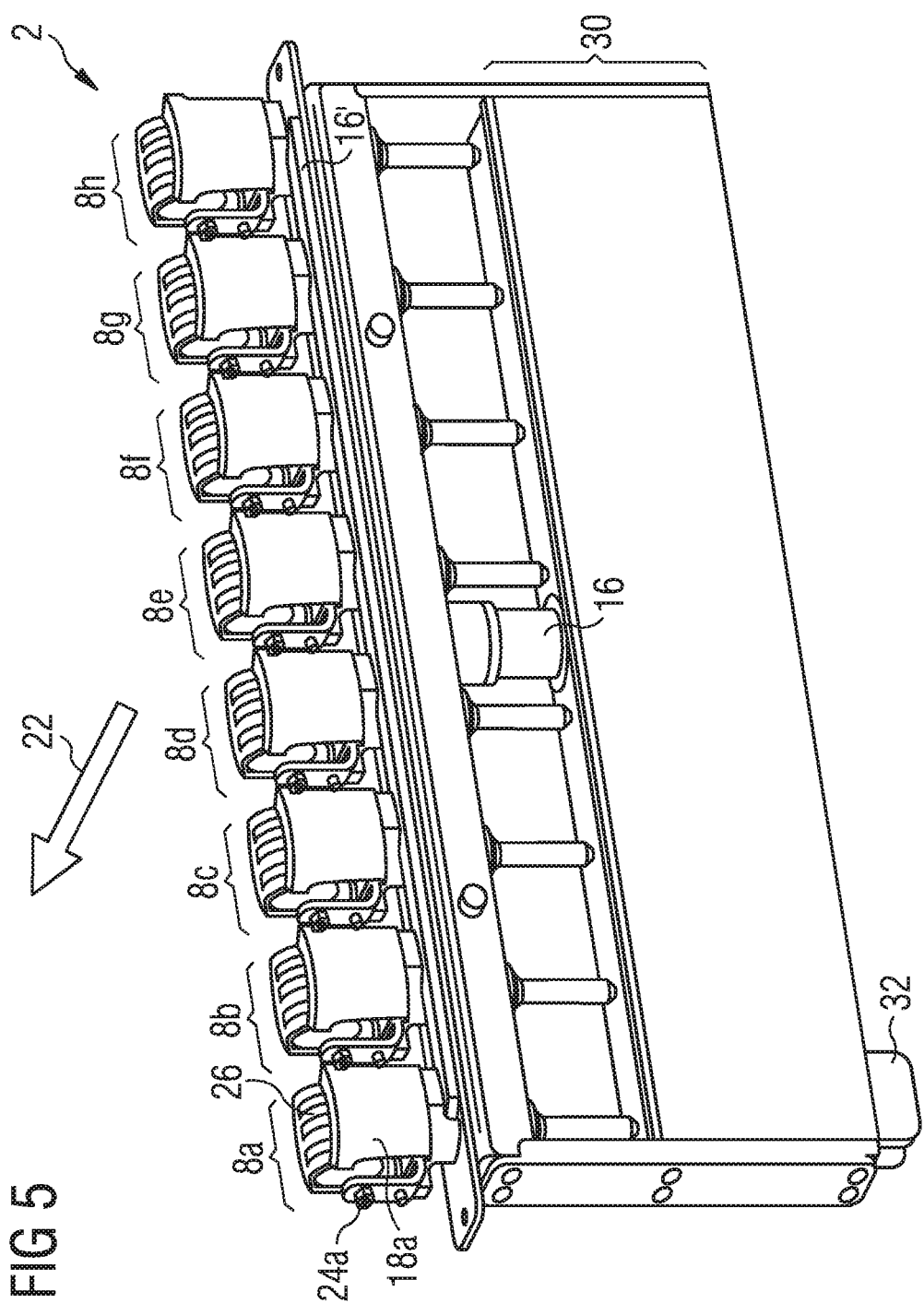
FIG. 5 A modular conveying unit with transport rollers arranged in an ordered manner along a line.

FIG. 5 shows a modular conveying unit 2 with transport rollers 8a-8h arranged in an ordered manner along a line according to yet another embodiment of the invention. The conveying unit 2 comprises transport roller bearings 24a-24h for the specific transport rollers 8a-8h and in each case a drive means 18a-18h designed as an external motor for the specific transport rollers 8a-8h. The modular conveying unit 2, like the conveying unit 2 of FIG. 3, has a common adjustment device 16 with an adjustment device axis 16' for the simultaneous adjustment of the axis of rotation 10a-10h of all the transport rollers 8a-8h. The modular conveying unit 2 also a compact built-in electronic unit 30 which, in addition to a control unit 20, also has a connecting device 32 for uncomplicated connection to a higher-level controller 21.

The surface of the transport rollers 8a-8h is partially coated with a friction lining 26 designed as a friction belt, which optimizes the transmission of the movement of the transport roller 8 to the goods item 4. The friction lining is durably designed and thus requires very little maintenance.

FIG. 6 shows a further conveying unit 2 in plan view comprising a plurality of transport rollers 8 according to an embodiment of the invention. The transport rollers 8 are arranged in the manner of roller carpet and individually adjustable and actuatable. The supported goods 4, 4' to be transported are transported in the main transport direction 22, wherein the orientation of the goods 4' which are not aligned parallel to the main transport direction 22 is changed during their transport by those transport rollers 8 on which a goods item 4 is supported with the same or different pivot axis angles 14 being driven with a different rotational speed and/or direction of rotation.

According to a further embodiment, the transport rollers 8 of a conveying unit 2 are arranged in a circle and are thus even better suited to rotating a goods item 4. A plurality of conveying units 2 can be arranged as desired one behind the other and/or next to one another and thus also enable the simultaneous directional transport and rotation of a plurality of goods items 4 which cannot be supported on the transport rollers 8 of a conveying unit 2 at the same time due to their dimensions. The conveying units 2 are actuated in a coordinated manner.

LIST OF REFERENCE CHARACTERS

2 Conveying unit
4 Goods item
6 Transport plane
8 Transport roller
10 Axis of rotation
12 Pivot axis
14 Pivot axis angle
16 Adjustment device
16' Adjustment device axis
18 Drive means
20 Control unit
22 Main transport direction
24 Transport roller bearing
26 Friction lining
30 Electronic unit comprising control unit 20
32 Connecting device
34 Transport direction

The invention claimed is:

1. A conveying unit for transporting goods in a transport plane, the conveying unit comprising:
   transport rollers rotatably mounted about respective axes of rotation with an adjustable rotational speed and an adjustable direction of rotation; and
   the axes of rotation of said transport rollers extending substantially parallel to the transport plane and being adjustable by rotation by a given pivot axis angle about respective pivot axes that extend substantially orthogonally to the transport plane and being selectively adjustable to extend non-orthogonally to the transport plane; and
   a control unit configured for actuating said transport rollers, to adjust the pivot axis angle of two or more of said transport rollers, and to individually control a rotation of said two or more of said transport rollers; and
   wherein at least two of said transport rollers are adjustable differently from one another.

2. The conveying unit according to claim 1, wherein said transport rollers have a rounded spherical surface in an area intended for contact with the goods.

3. The conveying unit according to claim 1, further comprising actuatable drive devices for driving a transport roller.

4. The conveying unit according to claim 3, wherein said drive devices are servo drives.

5. The conveying unit according to claim 1, wherein said transport rollers are selectively drivable in a positive direction of rotation and a negative direction of rotation opposite the positive direction.

6. The conveying unit according to claim 1, wherein the pivot axis angle is continuously adjustable.

7. The conveying unit according to claim 1, wherein two or more of said transport rollers are arranged in a given order.

8. The conveying unit according to claim 7, wherein said two or more said transport rollers are arranged along a line.

9. The conveying unit according to claim 1, wherein said transport rollers have a circumferential surface which, in an area intended for contact with the goods, in an optimized manner for the transport of goods with regard to contour and/or surface quality.

10. The conveying unit according to claim 1, wherein said control unit is configured to actuate said transport rollers as a function of a position and/or an orientation of one or more items of the goods.

11. A method for adjusting a conveying unit having transport rollers for transporting goods on a transport plane, the method comprising:

selectively rotating the transport rollers about respective axes of rotation thereof extending substantially parallel with the transport plane with an adjustable rotational speed and an adjustable direction of rotation via a control unit; and selectively pivoting the axes of rotation of the transport rollers about respective pivot axes by a particular pivot axis angle via the control unit, with the pivot axis selectively extending orthogonally and non-orthogonally to the transport plane;

individually adjusting the rotational speed and the direction of rotation of the transport rollers via the control unit, and jointly adjusting the pivot axis angle of groups of at least two of the transport rollers; and transporting an item of the goods item by way of the adjusted transport rollers.

12. The method according to claim 11, which comprises adjusting at least one parameter selected from the group consisting of the rotational speed, the direction of rotation, and the pivot axis angle of at least two of the transport rollers of the conveying unit differently from one another.

13. The method according to claim 11, which comprises adjusting two or more of the conveying units in a coordinated manner.

\* \* \* \* \*